United States Patent [19]
Aida et al.
[11] Patent Number: 4,732,722
[45] Date of Patent: Mar. 22, 1988

[54] PROCESS FOR PRODUCING A CROSSLINKED POLYOLEFIN INSULATED POWER CABLE

[75] Inventors: Fumio Aida, Tokyo; Takeo Shiono, Yokohama; Misao Hanai, Yokohama; Shahrzad Tassavori, Yokohama, all of Japan

[73] Assignee: Showa Electric Wire & Cable Co., Ltd., Japan

[21] Appl. No.: 798,114

[22] Filed: Nov. 14, 1985

[30] Foreign Application Priority Data

Nov. 27, 1984 [JP] Japan .......................... 59-179779[U]
Sep. 25, 1985 [JP] Japan .......................... 60-211657

[51] Int. Cl.[4] .......................... B29C 35/02
[52] U.S. Cl. .......................... 264/105; 174/120 SC; 264/22; 264/174; 264/236; 264/437; 425/113
[58] Field of Search .......................... 264/174, 105, 236, 22, 264/347; 425/113; 174/102 SC, 105 SC, 106 SC, 120 SC

[56] References Cited

U.S. PATENT DOCUMENTS 3,187,071 6/1965 Radziejowski .......................... 264/236
3,479,446 11/1969 Arnaudin, Jr. et al. .......................... 264/174
3,876,446 4/1975 Bleckmann et al. .......................... 264/22
4,041,237 8/1977 Stine et al. .......................... 174/36
4,061,703 12/1977 Rothenberg et al. .......................... 264/174
4,130,450 12/1978 Bahder et al. .......................... 264/174
4,138,462 2/1979 Procida et al. .......................... 264/347
4,220,615 9/1980 Sommarland .......................... 264/236
4,276,251 6/1981 Bopp .......................... 264/174
4,471,215 9/1984 Blumer .......................... 264/22

FOREIGN PATENT DOCUMENTS 48-14035 5/1973 Japan .......................... 264/174
49-26791 7/1974 Japan .......................... 264/174
49-39348 10/1974 Japan .
51-4263 2/1976 Japan .......................... 264/174
52-58000 5/1977 Japan .......................... 264/236
2076419A 12/1981 United Kingdom .......................... 264/174

*Primary Examiner*—Jeffery Thurlow
*Attorney, Agent, or Firm*—Lorusso & Loud

[57] ABSTRACT

A crosslinked polyolefin insulated power cable with remarkably improved AC breakdown voltage and impulse withstand voltage has been obtained by a process which comprises extrustion-coating, on the outer surface of a conductor, (1) a material for the formation of an inner semiconductive layer, comprising a base polymer and N-vinylcarbazole, (2) a crosslinkable polyolefin material for the formation of a crosslinked polyolefin insulating layer and (3) a material for the formation of an outer semiconductive layer in this order and then subjecting the coated conductor to a crosslinking treatment to form, on the outer surface of the conductor, an inner semiconductive layer, a crosslinked polyolefin insulating layer and an outer semiconductive layer in this order.

10 Claims, 1 Drawing Figure

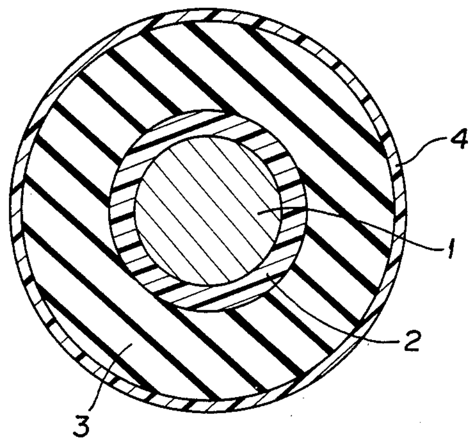
4
1
2
3

PROCESS FOR PRODUCING A CROSSLINKED POLYOLEFIN INSULATED POWER CABLE

BACKGROUND OF THE INVENTION (1) Field of the Invention

This invention relates to a process for producing a crosslinked polyolefin insulated power cable. More particularly, the present invention relates to a process for producing a crosslinked polyolefin insulated power cable with good AC breakdown withstand voltage characteristic.

(2) Description of the Prior Art

Power cables have conventionally been structured so as to comprise a semiconductive layer inside and/or outside of an insulating layer for weakening of electric field. Since these power cables are excellent in electrical characteristics and easy in maintenance, their utilization as a high voltage cable is in active development.

Regarding the use of noncontaminated polyolefin as an insulator in high voltage cables, the adoption of a dry crosslinking method as a crosslinking method for reduction of moisture content, the adoption of a water-proof layer for prevention of water penetration from outside, etc. have been investigated. In high voltage cables, the reduction of thickness of the insulating layer is another important consideration and, to achieve same, it is necessary to enhance the electrical breakdown stress of the insulator and to increase the strength of the interface between semiconductive layer and insulating layer. In this connection, one method previously proposed is to add a substance having a voltage-stabilizing effect such as a chlorinated normal paraffin, a silicone oil, glycidyl methacrylate or the like to the semiconductive layer [Japanese Patent Laid-open (Kokai) No. 151709/1980, Japanese Patent Post-Examination Publication (Kokoku) No. 39348/1974, Japanese Utility Model Laid-open (Kokai) No. 70082/1979, etc.].

However, the high voltage cables produced in accordance with the above mentioned method are still incapable of increasing the AC breakdown voltage because the added voltage-stabilizing substance bleeds out of the semiconductive layer or acts as an impurity.

SUMMARY OF THE INVENTION

An object of the present invention is to provide a process for producing a crosslinked polyolefin insulated power cable with remarkably improved AC breakdown voltage.

The above mentioned and other objects of the present invention will become apparent from the following description.

The objects of the present invention have been achieved by a process for producing a crosslinked polyolefin insulated power cable consisting of a conductor, an inner semicondutive layer formed on said conductor and a crosslinked polyolefin insulating layer formed on said inner semiconductive layer, which comprises extrusion-coating, on the outer surface of a conductor, (1) a material for the formation of an inner semiconductive layer, comprising a base polymer and N-vinylcarbazole, (2) a crosslinkable polyolefin material for the formation of a crosslinked polyolefin insulating layer and (3) a material for the formation of an outer semiconductive layer, in this order, and then subjecting the coated conductor to a crosslinking treatment to form, on the outer surface of the conductor, an inner semiconductive layer and a crosslinked polyolefin insulating layer, in this order.

BRIEF DESCRIPTION OF THE DRAWING

The drawing is a sectional view of a crosslinked polyolefin insulated power cable obtained according to the process of the present invention.

DETAILED DESCRIPTION OF PREFERRED EMBODIMENTS

As the first step in the process of the present invention for producing a crosslinked polyolefin insulated power cable, there are extrusion-coated, on the outer surface of a conductor, (1) a material for the formation of an inner semiconductive layer, comprising a base polymer and N-vinylcarbazole, (2) a crosslinkable polyolefin material for the formation of a crosslinked polyolefin insulating layer and (3) a material for the formation of an outer semiconductive layer, in this order.

This extrusion coating is conducted according to a method which is well known and conventionally used in the production of crosslinked polyolefin insulated power cables.

As the base polymer constituting the material for the formation of an inner semiconductive layer, there is preferably used at least one well known and conventional polymer selected from the group consisting of polyethylene, and ethylene-α-olefin copolymers, ethylene-ethylacrylate (EEA) copolymers and the like.

N-Vinylcarbazole which may be a monomer an oligomer or a combination thereof, is used together with a base polymer. Consequently, the resulting power cable retains satisfactory characteristics even after long use.

The material for the formation of an inner semiconductive layer contains an electroconductive substance such as carbon black, acetylene black and so on, in order to impart thereto electrical semiconductivity. The material may optionally further contain conventional additives such as an anti-oxidant and the like.

The amounts of the base polymer compound comprising the base polymer, the electroconductive substance, and N-Vinylcarbazole all of which constitute the material for the formation of an inner semiconductive layer are preferably 100 parts by weight (the former) and 0.02 to 25 parts by weight (the latter). The reason is that when the amount of N-vinylcarbazole added is less than 0.02 part by weight based on 100 parts by weight of base polymer, the effect on improvement of withstand voltage is too small and, when the amount exceeds 25 parts by weight, there is no further increase of the effect on improvement of withstand voltage and mechanical characteristics are reduced.

In the process of the present invention, the coated conductor after the above mentioned extrusion coating is subjected to a crosslinking treatment to obtain a crosslinked polyolefin insulated power cable consisting of a conductor, an inner semiconductive layer formed on the outer surface of said conductor, a crosslinked polyolefin insulating layer formed on said inner semiconductor layer and an outer semiconductive layer formed on said crosslinked polyolefin insulating layer.

The crosslinking treatment is preferably conducted in accordance with a well known and conventionally used method such as heating in the presence of a crosslinking agent (e.g. an organic peroxide), applying radiation, and so on.

The crosslinkable polyolefin material is crosslinked by the crosslinking treatment, whereby a crosslinked polyolefin insulating layer is formed. Also in the crosslinking treatment, part of N-vinylcarbazole present in the inner semiconductive layer is diffused into the polyolefin insulating layer by the heat applied for crosslinking and is grafted to the molecular chains of the polyolefin insulating layer by the action of the crosslinking agent present in the crosslinked polyolefin insulating layer.

Owing to the above behavior of N-vinylcarbazole, there can be obtained a crosslinked polyolefin insulated power cable with satisfactory AC breakdown voltage.

In the process of the present invention, addition of a crosslinking aid agent to the material for the formation of an inner semiconductive layer further promotes the diffusion of N-vinylcarbazole into the insulating layer and its grafting to the polyolefin, whereby there can be obtained a crosslinked polyolefin insulated power cable having a satisfactry AC breakdown voltage and retaining a satisfactry AC breakdown withstand voltage even after long use.

Such a crosslinking aid agent, is preferably selected from acrylates and methacrylates such as lauryl methacrylate, ethylene glycol acrylate, triethylene glycol dimethacrylate, polyethylene glycol dimethacrylate, tetraethylene glycol dimethacrylate, trimethylolpropane trimethacrylate, methyl methacrylate, etc; allyl compounds such as diallyl fumarate, diallyl phthalate, tetraallyloxyethane, triallyl cyanurate, triallyl isocyanurate, etc; maleimides such as maleimide, phenylmaleimide, etc; unsaturated dicarboxylic acids such as maleic anhydride, itaconic acid, etc; aromatic vinyl compounds such as divinylbenzene, vinyltoluene, etc; polybutadienes such as 1,2-polybutadiene, etc; and trimellitic acid esters such as trimethyl trimellitate, etc.

When a crosslinking aid agent is used, the ratio of the components in the material for the formation of an inner semiconductive layer is preferably 100 parts by weight of base polymer, 0.02 to 25 parts by weight of N-vinylcarbazole and 1 part by weight or less of crosslinking aid agent.

The reason why the amount of crosslinking aid agent is preferably 1 part by weight or below based on 100 parts by weight of base polymer is that addition of crosslinking aid agent exceeding 1 part by weight inhibits the diffusion of N-vinylcarbazole.

In the process of the present invention, subjecting the coated conductor to preliminary heating prior to a crosslinking treatment further promotes the diffusion of N-vinylcarbazole into the polyolefin insulating layer and its grafting to the polyolefin, whereby there can be obtained a crosslinked polyolefin insulated power cable with an excellent chemical stability as well as a satisfactory AC breakdown withstand voltage even after long use.

The temperature of the preliminary heating is preferably 60° to 180° C., more preferably 70° to 110° C. The time of the preliminary heating is preferably 1 to 120 min, more preferably 5 to 30 min. When the temperature is lower than 60° C., the diffusion of N-vinylcarbazole into the insulating layer is not sufficient. When the temperature exceeds 180° C., the insulating layer tends to deform. When the time is shorter than 1 min, the diffusion of N-vinylcarbazole into the insulating layer is not sufficient. When the time is longer than 120 min, N-vinylcarbazole easily diffuses as far as the outer semiconductive layer outside the insulating layer.

The material for the outer semiconductive layer used in the process of the present invention may be the same as or different from that for the inner semiconductive layer.

In the above, the addition of N-vinylcarbazole to the semiconductive layer(s) of power cables and its effect have been described. The same effect can be obtained also when N-vinylcarbazole is added to the semiconductive portions of joints, branches, terminations and so on of power cables.

Hereafter the present invention will be described in detail with reference to Examples. However, the present invention is not restricted to these Examples.

EXAMPLES 1 TO 10 AND COMPARATIVE EXAMPLES 1 TO 5

In accordance with the following procedure, there were produced crosslinked polyethylene insulated power cables of the present invention, each consisting of a conductor 1, an inner semiconductive layer 2 formed on the outer surface of said conductor 1, a crosslinked polyethylene insulating layer 3 formed on said layer 2 and an outer semiconductive layer 4 formed on said layer 3, as illustrated in the drawing.

On a conductor 1 of 1.2 mm in diameter was extrusion-coated a material for the formation of an inner semiconductive layer 2, composed of 30 parts by weight of a polyethylene, 35 parts by weight of an ethylene-α-olefin copolymer, 35 parts by weight of an electroconductive carbon black, 0.2 part by weight of an anti-oxidant, 0.5 part by weight of a crosslinking agent and an additive whose chemical description and weight are given in Table 1 (except that no additive was used in Comparative Example 1). Later on a crosslinkable polyethylene material for the formation of an insulating layer 3 and also a material for the formation of an outer semiconductive layer 4 were extrusion-coated. The resulting coated conductor was subjected to crosslinking treatment according to an ordinary method, whereby an experimental cable was prepared. All the prepared experimental cables were measured for AC breakdown voltage. The measurement results are shown in Table 1.

TABLE 1

| | Example | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Additive, parts by weight | | | | | | | | | | | | | | | |
| N—vinylcarbazole monomer | 0.1 | 0.5 | 1 | 5 | 10 | | | | | | | | | | |
| N—vinylcarbazole oligomer | | | | | | 0.1 | 0.5 | 1 | 5 | 10 | | | | | |
| Chlorinated normal paraffin | | | | | | | | | | | | 3 | | | |
| Tetrafluoroethylene | | | | | | | | | | | | | 3 | | |
| Silicone oil | | | | | | | | | | | | | | 3 | |

TABLE 1-continued

| | Example 1 | 2 | 3 | 4 | 5 | 6 | 7 | 8 | 9 | 10 | Comparative Example 1 | 2 | 3 | 4 | 5 |
|---|---|---|---|---|---|---|---|---|---|---|---|---|---|---|---|
| 2,4,6-Trinitrotoluene | | | | | | | | | | | | | | | 1.5 |
| Diphenylamine | | | | | | | | | | | | | | | 1.5 |
| Characteristic | | | | | | | | | | | | | | | |
| AC breakdown voltage KV/mm | 57 | 59 | 71 | 73 | 73 | 68 | 70 | 73 | 75 | 76 | 45 | 45 | 46 | 49 | 47 |
| AC breakdown voltage after thermal degradation KV/mm | 54 | 55 | 61 | 63 | 62 | 66 | 70 | 73 | 75 | 75 | 45 | 45 | 46 | 49 | 47 |

EXAMPLES 11 TO 13

On a conductor 1 of 1.2 mm in diameter was extrusion-coated a material for the formation of an inner semiconductor layer 2, composed of 30 parts by weight of a polyethylene, 34 parts by weight of an ethylene-α-olefin copolymer, 36 parts by weight of an electroconductive carbon black, 0.2 part by weight of an anti-oxidant, 0.5 part by weight of a crosslinking agent and an additive whose chemical description and weight part are given in Table 2. Subsequently, a crosslinkable polyethylene material for the formation of an insulating layer 3 and also a material for the formation of an outer semiconductor layer 4 were extrusion-coated. The resulting coated conductor was subjected to crosslinking at 180° to 190° C. according to an ordinary method, whereby an experimental cable was prepared. All the prepared experimental cables were measured for AC breakdown voltage as well as for AC breakdown voltage after thermal degradation by vacuum drying of 50° C.×5 days. The measurement results are shown in Table 2. In Table 2, the result of Comparative Example 1 of Table 1 is also shown for comparison.

TABLE 2

| | Example 11 | 12 | 13 | Comp. Ex. 1 |
|---|---|---|---|---|
| Additive, parts by weight | | | | |
| N—vinylcarbazole monomer | 1 | 1 | 1 | — |
| Triallyl isocyanurate | 0.5 | — | — | — |
| Trimethylolpropane methacrylate | — | 0.5 | — | — |
| Trimethyl trimellitate | — | — | 0.5 | — |
| Characteristic | | | | |
| AC breakdown voltage, initial KV/mm | 75 | 73 | 75 | 45 |
| AC breakdown voltage, after thermal degradation, KV/mm | 75 | 73 | 73 | 45 |

EXAMPLES 14 TO 20

On a conductor 1 of 1.2 mm in diameter was extrusion-coated in a thickness of 0.5 mm a material for the formation of an inner semiconductive layer 2, composed of 100 parts by weight of ethylene-ethylacrylate (EEA) copolymer, 56 parts by weight of acetylene black, 0.7 part by weight of an anti-oxidant, 0.8 part by weight of a crosslinking agent and 1 part by weight of N-vinylcarbazole. Later on, a crosslinkable polyethylene material for the formation of an insulating layer 3 in a thickness of 1 mm and also a material for the formation of an outer semiconductive layer 4 in a thickness of 0.5 mm, were extrusion-coated. The resulting coated conductor was subjected to preliminary heating under the conditions (temperature and time) shown in Table 3 and then to crosslinking treatment at 180° to 190° C. according to an ordinary method, whereby an experimental cable was prepared. All the prepared experimental cables were measured for AC breakdown voltage as well as for AC breakdown voltage after thermal degradation by vacuum drying of 70° C.×5 days. The measurement results are shown in Table 3. Comparative Example 6 is a case in which no preliminary heating was conducted whereas Comparative Example 7 is a case containing no N-vinylcarbazole.

TABLE 3

| | Example 14 | 15 | 16 | 17 | 18 | 19 | 20 | Comp. Ex. 6 | 7 |
|---|---|---|---|---|---|---|---|---|---|
| Temperature of preliminary heating, °C. | 90 | 90 | 90 | 110 | 110 | 110 | 150 | — | — |
| Time of preliminary heating, min | 5 | 10 | 30 | 5 | 10 | 30 | 3 | — | — |
| AC breakdown voltage, initial, KV/mm | 71 | 71 | 71 | 71 | 71 | 71 | 71 | 71 | 55 |
| AC breakdown voltage, after thermal degradation, KV/mm | 67 | 71 | 71 | 68 | 71 | 71 | 71 | 61 | 55 |

What is claimed is:

1. A process for producing a crosslinked polyolefin insulated power cable consisting of a conductor, an inner semiconductive layer formed on the outer surface of said conductor and a crosslinked polyolefin insulating layer formed on said inner semiconductive layer, the process comprising:

extrusion-coating, on the outer surface of a conductor, (1) a first layer of a material, for the formation of an inner semiconductive layer, comprising a base polymer and N-vinylcarbazole, (2) a second layer of a crosslinkable polyolefin material for the formation of a crosslinked polyolefin insulating layer, said second layer being superimposed on said first layer, and (3) a third layer of a material for the formation of an outer semiconductive layer said third layer being superimposed on said second layer; and then subjecting the coated conductor to a crosslinking treatment to cause a portion of said N-vinylcarbazole to diffuse into said second layer, thereby increasing the AC breakdown voltage of said second layer, and to form, on the outer surface of the conductor, an inner semiconductive layer, an intermediate crosslinked polyolefin insulating layer containing the diffused N-vinylcarbazole and an outer semiconductive layer.

2. A process according to claim 1, wherein the base polymer is at least one member selected from the group consisting of a polyethylene, an ethylene-α-olefin copolymer and ethylene-ethylacrylate (EEA) copolymer.

3. A process according to claim 1 wherein the N-vinylcarbazole is in the form of a monomer, an oligomer or an admixture thereof.

4. A process according to claim 1, wherein the material for the formation of an inner semiconductive layer is composed of 100 parts by weight of base polymer compound and 0.02 to 25 parts by weight of N-vinylcarbazole.

5. A process according to claim 1, wherein the material for the formation of an inner semiconductive layer further comprises a crosslinking aid agent.

6. A process according to claim 5, wherein the material for the formation of an inner semiconductive layer is composed of 100 parts by weight of base polymer compound, 0.02 to 25 parts by weight of N-vinylcarbazole and 1 part by weight or less of a crosslinking aid agent.

7. A process according to claim 5, wherein the crosslinking aid agent is at least one member selected from the group consisting of acrylates and methacrylates, allyl compounds, maleimides, unsaturated dicarboxylic acids, aromatic vinyl compounds, polybutadienes and trimellitic acid esters.

8. A process according to claim 1, wherein the coated conductor is subjected to a preliminary heating treatment prior to the crosslinking treatment.

9. A process according to claim 8, wherein the preliminary heating treatment is conducted to 60° to 180° C. for 1 to 120 min.

10. A process according to claim 8, wherein the material for the formation of an inner semiconductive layer is composed of 100 parts by weight of base polymer compound and 0.02 to 25 parts by weight of N-vinylcarbazole.

* * * * *

UNITED STATES PATENT AND TRADEMARK OFFICE
CERTIFICATE OF CORRECTION

PATENT NO. : 4,732,722
DATED : March 22, 1988
INVENTOR(S) : AIDA et al

It is certified that error appears in the above—identified patent and that said Letters Patent is hereby corrected as shown below:

In the Abstract, line 4, "extrustion" should read --extrusion--.

Col. 1, line 57, "semicondutive" should read --semiconductive--.

Col. 2, lines 61-62 "semiconductor" should read --semiconductive--.

Col. 5, line 17, "semiconductor" should read --semiconductive--,
line 26, "semiconductor" should read --semiconductive--.

Signed and Sealed this

Nineteenth Day of July, 1988

*Attest:*

DONALD J. QUIGG

*Attesting Officer* *Commissioner of Patents and Trademarks*